United States Patent Office 3,382,670
Patented May 14, 1968

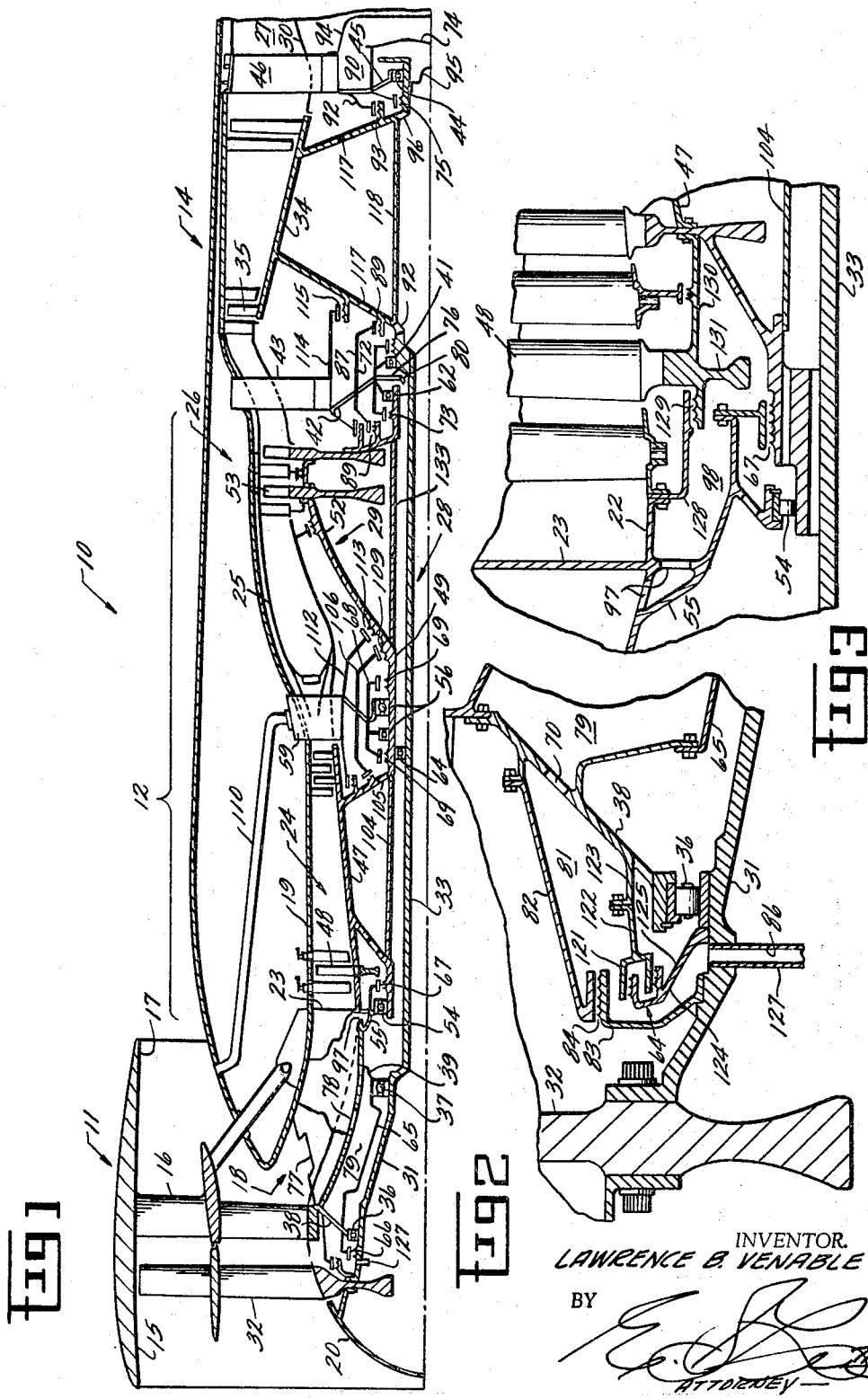

3,382,670
GAS TURBINE ENGINE LUBRICATION SYSTEM
Lawrence B. Venable, Cincinnati, Ohio, assignor to General Electric Company, a corporation of New York
Filed Dec. 1, 1966, Ser. No. 598,520
9 Claims. (Cl. 60—39.08)

The present invention relates to lubrication systems for gas turbine engines.

Modern gas turbine engines generally comprise a rotor, or rotors, journaled by means of a series of bearing assemblies. The bearing assemblies are lubricated by means of a recirculating lubrication system which provides a flow of lubricating fluid through sump chambers surrounding the bearing assemblies. Annular seals are provided between the sump chamber walls and the rotor, or rotors, to minimize the loss of lubricating fluid from the sump. In order to prevent loss of lubricating fluid from the sumps, the exterior faces of the sump seals are pressurized to a level higher than the pressure in the sump chamber, thus causing a flow of gas into the sump chamber.

In the past it has been common practice to utilize relatively high pressure discharge air from a compressor of the gas turbine engine for this purpose. Generally, this air is passed through conduits which are disposed along the exterior of the engine, and extend radially inward across the annular gas flow path through the engine to the sump seals.

Several problems arise with such an arrangement. One of the problems is that external conduits increase the complexity of the engine in addition to increasing its external dimensions. Another, and more significant problem arises when the conduits are disposed so that hot combustion gases pass around the radial portion of the conduits. The seal pressurization air, which is already relatively hot from pressurization by the compressor, is heated as it passes through the conduits, which, in turn, heats up the bearing sump chamber. Furthermore, the temperature of the sump chambers is elevated by heat transferred from the hot gas stream through adjacent supporting structures. The rise in temperature of the sump chamber can impair the lubricating properties of the lubricating fluid and may substantially increase the wear of the bearings.

Accordingly, it is an object to provide a highly effective and simplified lubrication system for a gas turbine engine.

It is a further object of the present invention to minimize the temperature rise of sump chambers in a gas turbine engine lubricating system.

The above ends are achieved in a gas turbine engine having hollow core engine rotor means defining the inner bounds of an annular gas flow path through a core engine. The gas turbine engine also has a hollow rotor comprising a fan rotor disposed upstream of the core engine rotor means and having a bladed portion for pressurizing air for delivery through the annular flow path to the core engine. A fan turbine rotor is disposed downstream of the core engine rotor means. The fan turbine rotor has a bladed portion driven by the annular gas flow path from the core engine. A relatively small diameter shaft extending through thei nterior of the core engine rotor means interconnects the fan rotor and the turbine rotor.

At least one bearing assembly is provided for journaling the fan turbine rotor. A sump through which lubricating fluid is circulated is provided to surround the bearing assembly. Seal means are provided between the fan turbine rotor and the sump for minimizing leakage of lubricating fluid from the sump. A seal pressurization chamber is provided to surround the seal means. Passageway means are connected to the flow path from the bladed portion of the fan rotor and extend through the interior of the rotor to the chamber for the seal means. The air from the discharge stream of the fan rotor pressurizes the seals to prevent leakage of lubricating fluid from the sump.

In another aspect of the invention, the discharge stream from the fan rotor is relatively cool and the seal pressurization chamber surrounds the sump. Therefore, the relatively cool air minimizes the temperature rise in the sump.

The above and other related objects and features of the present invention will be apparent from a reading of the following description of the disclosure found in the accompanying drawing and the novelty thereof pointed out in the appended claims.

In the drawing:

FIGURE 1 is a highly simplified diagrammatical illustration of a gas turbine engine embodying the present invention.

FIGURES 2 and 3 show, in greater detail, portions of the engine illustrated in FIGURE 1.

Reference is had to FIGURE 1 which shows, in schematic form, a dual rotor gas turbine engine 10 of the bypass type comprising a fan 11, core engine 12, and fan turbine 14. A shroud 15 and a spinner 20 form an annular inlet for air which is pressurized by the fan 11 for delivery past a series of fan stator vanes 16 to a bypass exhaust nozzle 17 and an annular inlet 18 for the core engine 12. The inlet 18 is formed by a structural engine casing 19 and an inner annular casing 22, secured to the structural engine casing 19 by a plurality of hollow radial struts 23. Air passes through the inlet 18 to a compressor 24 of the core engine 12 where it is further pressurized for delivery to a combustor 25. Fuel is injected into the combustor 25 by suitable means and the resultant fuel air mixture is ignited to generate a hot gas stream. The hot gas stream travels along an annular flow path from the combustor 25 through a core engine turbine 26 and the fan turbine 14 before it is discharged through an exhaust nozzle 27, shown in part. The exhaust nozzle 27 is formed by the engine casing 19, and a plug 30. The discharge of gas from the exhaust nozzle 27 and the bypass exhaust nozzle 17 provide a propulsive force for the engine 12.

The fan 11 comprises a stepped conical fan rotor 31 having a series of blades 32 extending into the annular inlet air stream. A tubular shaft 33 extends from the fan rotor 31 to a bypass turbine rotor 34 to form a fan rotor 28. The fan turbine rotor 34 has a series of blades 35 extending into the annular gas flow path through the engine. The fan rotor 31 is journaled by means of first and second bearing assemblies 36, 37 which are structurally connected to the base of the radial struts 23 by means of generally annular structural elements 38 and 39 respectively. The forward portion of the fan turbine rotor 34 is journaled in a bearing assembly 41 which is structurally connected to the engine casing 19 through an annular structural element 42 extending from the base of a series of radial struts 43. The aft portion of the fan turbine rotor 34 is journaled in a bearing assembly 44. The bearing assembly 44 is supported by a generally annular structural element 45 which is connected to the base of a series of radial struts 46 secured to the engine casing 19.

The compressor 24 of the core engine includes a compressor rotor 47 having a series of blades 48 extending into the annular gas stream through the core engine. A relatively small diameter tubular shaft 49, concentric with the tubular shaft 33, extends from the compressor rotor 47 to a core engine turbine rotor 52, to form a core engine rotor 29. The core engine turbine rotor 52 has a series of blades 53 extending therefrom into the annular gas flow path through core engine 12. The forward portion of the core engine compressor rotor 47 is journaled in a bearing 54 which is connected to the base of the radial struts 23 by means of a generally annular support element 55. A pair of bearing assemblies 56 are provided for journaling the tubular shaft 49 intermediate the compressor rotor 47 and the turbine rotor 52. The bearing assemblies 56 are mounted on a generally annular support element 58 which is secured to the base of a series of hollow radial struts 59, connected to the engine casing 19. The aft portion of the core engine turbine rotor 52 is journaled in a bearing assembly 62 which is suitably connected to the structural support element 42. An inner shaft bearing 64 is provided to journal the tubular shaft elements 33 and 49 relative to one another.

A series of annular sumps surround the bearing assemblies. A forward sump 65 surrounds the bearings 36, 37 of the fan rotor 31 and the bearing 54 of the compressor rotor 47. The sump 65 engages a forward portion of the fan rotor element 31 at a seal 66 and the forward portion of the compressor rotor 47 at a seal 67. A first intermediate sump 68 surrounds the bearing assemblies 56, 57 and engages the tubular shaft 49 at seals 69. A second intermediate sump 72 surrounds the bearing assembly 62 of the core engine turbine rotor 52, and the bearing assembly 41 of the fan turbine rotor 34. The sump 72 engages the rearward portion of the core engine turbine rotor 52 and the forward portion of the fan turbine rotor 34 at seals 73. An aft sump 74 surrounds the bearing 44 and engages the aft portion of the fan turbine rotor 34 at a seal 75.

A lubrication system is provided for circulating lubricating fluid around the various bearing assemblies. For this purpose, pressurized lubricating fluid is directed against the bearing assemblies through a series of nozzles 76 (only one of which is shown in sump 72). The oil injected into the sump chambers from the nozzles 76 is removed from the sumps by means of scavenge pumps (not shown) and discharged to a suitable source of lubricating fluid for repressurization.

The sumps 72 and 65 are interconnected by an annular passageway between the concentric rotors 28 and 29 which is formed, in part, by tubular wall elements 104 and 133, extending between the tubular shaft 49 and the forward and aft portions of the core engine rotor 29. The interconnection between the sump chambers 65 and 72 eliminates the need for an inner shaft seal. In addition, the interconnection between the sumps allows a flow path for fluid used to lubricate the inner shaft bearing 64. For this purpose, the nozzle 76, used to supply lubricating fluid to the bearings in sump chamber 72, has a nozzle 80 adapted to inject lubricating fluid into the clearance between the tubular shafts 28 and 29. The tubular shafts 28 and 29 have gradually increasing diameters from the sump in which the lubricating fluid is injected to the interconnected sump. This causes the oil to be forced towards the interconnected sump past the inner shaft bearing 64 by centrifugal force. The scavenge pump for the interconnected forward sump 65 is sized to handle the lubricating fluid from the bearings therein and the lubricating fluid from the inner shaft bearing 64.

To prevent loss of the lubricating fluid across the sump seals which engage the rotating members, the seals are pressurized by cool, relatively low pressure core engine inlet air in a manner now to be described.

Openings 77 are provided in the upstream edges of the struts 23 for flow of air to the interior thereof. From there, first and second flow parts are provided to the interior of the rotors 28, 29, respectively.

The flow path to the interior of the rotor 28 is provided by openings 78 in base of the struts 23 to permit flow of air into a chamber 79, formed in part, by the annular casing 22 and the sump chamber 65. As shown in detail in FIGURE 2, openings 70 in the support element 38 provide a flow path to a forward seal pressurization chamber 81. The chamber 81 is formed by an annular wall element 82 bolted to the structural element 38 and a flange 83 of the fan rotor 31. A seal 84 is provided between the annular wall 82 and the flange 83. The sump seal 66 is formed by an annular channel shaped element 121 having sealing surfaces on its side walls. The channel shaped element 121 is integral with an annular support element 122, bolted to a flange 123 of the support element 38. A second channel shaped annular element 124 has side walls with sealing surfaces thereon adapted to interfit with the sealing surfaces of the element 121. The element 124 has integral therewith, an annular structural element 125, secured to the fan rotor 31. Radial passageways 86 comprising tubes 127 are disposed in the fan rotor 31 to provide a flow path from the chamber 81 to the interior of the fan rotor 31. The interior of the tubular shaft 33 forms a flow path for air to the fan turbine rotor 34, sealed at the aft end by a plug element 95.

A series of passageways 92, formed in the forward portion of the fan turbine rotor 34, provide a flow path for pressurizing air from the interior thereof to a sump pressurization chamber 87 for the sump chamber 72. The walls of the seal pressurization chamber 87 are secured to the support element 42 and extend to the rear of the core engine turbine rotor 52 and the forward portion of the fan turbine rotor 34. Annular seals 89 are provided between the chamber walls and the core and fan turbine rotors 52, 34. Suitable openings (not shown) are provided in the support element 42 to connect the forward and aft portions of the seal pressurization chamber 87.

Openings 96 in the aft portion of the fan turbine rotor 34 provide a flow path for pressurizing air from the interior of the fan turbine rotor 34 to an aft seal pressurization chamber 90.

The aft seal pressurization chamber 90 is formed by a generally annular wall element 92 which extends to the aft portion of the fan turbine rotor 34. A seal 93 is provided between the wall element 92 and the fan turbine rotor 34. A cap element 94 extends from the annular member 92 to surround the aft end of the bypass engine rotor 28. Suitable openings are provided in the support element 45 to connect the portions of the seal pressurization chamber that are formed by the annular wall element 92 and the cap element 94.

A second series of openings 97 in the aft portion of the struts 23 provide the flow path to the interior of the compressor rotor 47. As shown particularly in FIGURE 3, the openings 97, provide a flow path for air from the interior of the struts 23 to a seal pressurization chamber 98. The seal pressurization chamber 98 is defined by an annular wall element 128, bolted to the casing 22. A seal 129 is provided between wall element 128 and a flange 130 on a forward compressor disc 131 of the compressor 24. Radially inward passageways 103 are formed in the compressor rotor to provide a flow path from the chamber 98 to the rotor interior.

The tubular wall element 104 between the forward and aft portions of the compressor rotor 47 defines a flow path for seal pressurizing air to a seal pressurization chamber 106 for the sump 68, through openings 105. The walls of the chamber 106 are secured to the support element 58 and extend to the compressor rotor 47 and the forward portion of the turbine rotor 52. Seals 109 are provided between the chamber walls and the compressor turbine rotors 47, 52. Suitable openings (not shown) are provided in the support element for connecting the forward and aft portions of the seal pressurization chamber 106.

In operation, air from the inlet of the core engine 12 passes to the interior of the struts 22 and then to the sump pressurization chambers, along internal passageways, which are provided in part by interior surfaces of the rotors 28, 29. As the pressurizing air flows through the passageways 86, 103 to the interior of the fan and compressor rotors 31, 47, respectively, it is urged into rotation thereby causing any particulate matter in the air stream to be thrown outwardly away from the rotor interiors. In addition, the seal pressurizing air leaking across seal 66 into the sump 65 generally follows a radially inward path and is urged into rotation by the channel shaped element 124, to force particulate matter radially outward. The air that passes through chamber 98 passes around the base of disc 131, and is urged into rotation somewhat, thereby forcing any particulate matter radially outward.

The relatively cool sump seal pressurization air surrounds the sumps 68, 72 and 74 to provide a thermal barrier against transmission of heat to the sumps from the relatively hot annular gas stream of the engine 10. In order to maintain the temperature in the seal pressurization chambers for sumps 68, 72, and 74 relatively cool, the chambers are continuously purged of seal pressurization air.

For this purpose, a chamber 112 surrounds the seal pressurization chamber 106 of the first intermediate sump 62, to form a barrier between the high pressure air from the compressor 24 and the relatively low pressure air in chamber 112. The walls of the chamber 112 extends to the aft portion of the compressor rotor 47 and the forward portion of the turbine rotor 52. Seals 113 are provided between the walls of chamber 112 and the rotors 47 and 52. The chamber 112 is vented to the relatively low pressure gas stream in the bypass exhaust nozzle 17 through the hollow struts 59 and a conduit 110.

Similarly, a chamber 114 surrounds the seal pressurization chamber 88 for the second intermediate sump 62 to form a barrier between the relatively high pressure gas stream from the turbine 26 and the low pressure air in chamber 114. The walls of the chamber 114 extend to the aft portion of the turbine rotor 52 and the forward portion of the fan turbine rotor 34. Seals 115 are disposed between the chamber walls 114 and the rotors 52, 34. The chamber 88 is vented to the relatively low pressure gas stream in the exhaust nozzle 27 by providing openings 117 in the end faces of fan turbine rotor 34 and sealing that portion of the fan turbine rotor from seal pressurization air by a tubular wall element 118. The plug 30 is spaced from the end of the fan turbine rotor 34 to provide an opening, from the aft end face of the fan turbine rotor, into the exhaust nozzle 27.

In operation, a portion of the pressurized air in the seal pressurization chamber 106 (aft of the compressor rotor 47) leaks past the seals 108 into the chamber 112 because the sump seal pressurization air is maintained at a pressure level higher than that in the bypass exhaust nozzle 17. As a result, the leakage air from the seal pressurization air passes through chamber 112 to the bypass exhaust nozzle 17, thereby purging chambers 106 and 112 of air to maintain the air in chamber 112 at a relatively low temperature.

In like fashion, a portion of the seal pressurization air in chamber 88 leaks into chamber 114, because the seal pressurizing air is maintained at a higher pressure than the gas in the exhaust nozzle 27. The flow of air from chambers 88 and 112 to the exhaust nozzle 27 serves to purge air from chamber 88, thus maintaining it at a relatively low temperature. The air in seal pressurization chamber 90 is also purged because the leakage air from seal 93 passes directly to the relatively low pressure gas stream in the exhaust nozzle 27 through the opening between the fan turbine rotor 34 and the plug 30.

It is apparent from the above description that the present invention provides highly effective means for supplying sump seal pressurization air without the need for external engine conduits and for maintaining the sump chambers at relatively low temperatures.

While a preferred embodiment of the present invention has been described, modifications will occur to those skilled in the art without departing from the spirit of the present invention. Therefore, the scope of the invention is to be determined solely by the following claims.

Having described the invention, what is claimed as novel and desired to be secured by Letters Patent of the United States is:

1. In a gas turbine engine having a hollow core engine rotor means defining the inner bounds of an annular gas flow path through a core engine;
  a hollow rotor comprising;
    a fan rotor disposed upstream of said core engine rotor means and having a bladed portion for pressurizing air for delivery through the annular flow path to said core engine,
    a fan turbine rotor disposed downstream of said core engine rotor means and having a bladed portion driven by the annular gas flow path from said core engine,
    a relatively small diameter shaft extending through the interior of said core engine rotor means for interconnecting said fan rotor and said fan turbine rotor,
  at least one bearing assembly for journaling said fan turbine rotor,
  a sump surrounding said bearing assembly through which lubricating fluid is circulated,
  seal means between the fan turbine rotor and said sump for minimizing leakage of lubricating fluid from said sump,
  a seal pressurization chamber surrounding said seal means,
  passageway means connected to the flow path from the bladed portion of said fan rotor and extending through the interior of said rotor to said chamber for the seal means,
  whereby air from the discharge stream of said fan rotor pressurizes said seals to prevent leakage of lubricating fluid from said sump.

2. Apparatus as in claim 1 wherein said passageway means includes;
  generally radial passageways extending through said fan rotor for urging the air passing therethrough into rotation,
  whereby any particulate matter in the air stream from the fan discharge is urged radially outward away from the rotor interior by centrifugal force.

3. Apparatus as in claim 1 wherein;
  the discharge stream from said fan rotor is relatively cool,
  said seal pressurization chamber surrounds said sump,
  whereby said relatively cool air minimizes the temperature rise in said sump.

4. Apparatus as in claim 3, wherein said engine further comprises;
  seal means between said seal pressurization chamber and said rotors,
  chamber means for providing a barrier between the exterior of said seal pressurization chambers and the annular gas flow path,
  passageway means for connecting said barrier chamber means to a portion of the annular gas stream having a lower pressure that that in said seal pressurization chamber so that air passes from said seal pressurization chamber to said annular gas stream,
  whereby said seal pressurization chamber is purged to minimize the temperature rise therein.

5. Apparatus as in claim 3 wherein a pair of bearing assemblies are provided for respectively journaling the forward and aft portions of said fan turbine rotor, and said engine further comprises;
  seal means between the seal pressurization chamber for the forward bearing assembly and the turbine rotor,
  chamber means for providing a barrier between the exterior of the forward seal pressurization chamber and the annular gas flow path between said core engine rotor and said fan turbine rotor, passageway means connected to said barrier chamber means and extending through said fan turbine rotor to the annular gas flow path downstream of said fan turbine so that air passes from said seal pressurization chamber to the annular gas flow path, whereby said seal pressurization chamber is purged to minimize the temperature rise therein.

6. Apparatus as in claim 5 wherein said engine further comprises;

a bearing assembly for journaling said fan rotor, a sump surrounding said bearing assembly through which lubricating fluid is circulated, seal means between said sump and said fan rotor for minimizing loss of lubricating fluid from said sump, a seal pressurization chamber means surrounding said seal means, radial passageway means connecting said fan rotor seal pressurization chamber to the interior of said rotor, and said passageway means is connected to said fan rotor seal pressurization chamber whereby said chamber forms in part said passageway means.

7. Apparatus as in claim 6 wherein;

said fan rotor bearing assembly journals said fan rotor adjacent the bladed portion thereof, said engine further comprises;

a bearing assembly for journaling said fan rotor adjacent the forward end of said core engine rotor, a pair of bearing assemblies for respectively journaling the forward and aft ends of said core engine rotor, said sump for surrounding said first mentioned fan rotor bearing assembly surrounds said last mentioned fan rotor bearing assembly and the forward bearing assembly for said core engine rotor to form a forward engine sump, said seal means for said forward engine sump are disposed between said sump and the fan rotor and core engine rotor, the sump for said forward fan turbine rotor bearing assembly surrounds the aft bearing assembly for said core engine rotor to form an intermediate engine sump, the seal means for said intermediate sump abut the aft portion of the core engine rotor and the forward portion of the fan turbine rotor, said engine further comprises annular interconnecting passageway means connected to said forward sump and extending between the core engine rotor and said rotor to the intermediate sump.

8. Apparatus as in claim 7 wherein said engine further comprises;

an intershaft bearing assembly disposed in said interconnecting passageway means for journaling said rotors relative to one another, means disposed in one of aid sumps for injecting lubricating fluid into said interconnecting passageway, and the diameter of said annular passageway means increases from the sump in which the injecting means is disposed to the interconnected sump, whereby lubricating fluid is circulated past said inner shaft bearing assembly.

9. Apparatus as in claim 8 wherein;

said core engine rotor comprises a compressor rotor and a turbine rotor and an interconnecting shaft, said engine further comprises;

a bearing assembly for journaling said core engine rotor intermediate said compressor and turbine rotors, a sump for surrounding said intermediate core engine rotor bearing assembly through which lubricating fluid is circulated, seal means disposed between said intermediate core engine sump and said core engine rotor for minimizing loss of lubricating fluid, a seal pressurization chamber surrounding said seal means, passageway means connected to said forward seal pressurization chamber means and extending through said compressor rotor to said core engine intermediate seal pressurization chamber, whereby the leakage of lubricating fluid from said intermediate core engine sump is prevented.

References Cited

UNITED STATES PATENTS

| | | | |
|---|---|---|---|
| 2,749,087 | 6/1956 | Blackman | 60—39.08 |
| 2,991,005 | 7/1961 | Hall | 230—207 |
| 3,034,298 | 5/1962 | White | 60—39.66 |
| 3,248,880 | 5/1966 | Hull. | |
| 3,313,105 | 4/1967 | Johnson. | |

CARLTON R. CROYLE, *Primary Examiner.*

D. HART, *Assistant Examiner.*